United States Patent [19]

Dudeck et al.

[11] 4,420,968
[45] Dec. 20, 1983

[54] UNDESIRABLE COMBUSTION CHARACTERISTIC DETECTION APPARATUS

[75] Inventors: Ingo Dudeck, Weinstadt; Manfred Maass, Esslingen, both of Fed. Rep. of Germany

[73] Assignee: Daimler-Benz Aktiengesellschaft, Fed. Rep. of Germany

[21] Appl. No.: 322,224

[22] Filed: Nov. 17, 1981

[30] Foreign Application Priority Data

Nov. 27, 1980 [DE] Fed. Rep. of Germany ....... 3044745

[51] Int. Cl.³ ............................................. G01L 23/22
[52] U.S. Cl. ...................................... 73/35; 73/117.3
[58] Field of Search ................. 73/35, 117.3; 123/425, 123/435

[56] References Cited

U.S. PATENT DOCUMENTS

| | | | |
|---|---|---|---|
| 4,012,942 | 3/1977 | Harned | 73/35 |
| 4,364,260 | 12/1982 | Chen et al. | 73/35 |
| 4,368,635 | 1/1983 | Yoshida | 73/35 |

*Primary Examiner*—Jerry W. Myracle
*Attorney, Agent, or Firm*—Craig & Burns

[57] ABSTRACT

A device for detecting undesirable combustion processes in internal combustion engines having spark-ignition systems, an acceleration sensor and a band-pass filter tuned to a frequency of a knocking vibration, with an output value of the filter being compared with a reference value, whereby results of the comparison are compared with undesirable combustion processes to be detected. Body noise signals received by the acceleration sensor pass through a band-pass filter. A series circuit composed of a band-blocking filter tuned to the frequency of the knocking vibration, including an r.m.s. rectifier and an amplifier, is provided through which the body noise signal received by the acceleration sensor is converted into a reference signal. A comparator is provided when the reference signal and the knocking signal are compared with one another, whereby an output signal appears when the knocking signal exceeds the reference signal. The band-blocking filter is constructed so that in addition to suppressing the knocking frequency, the filter also suppresses all frequencies below a lower frequency less than the knocking frequency and above an upper frequency higher than the knocking frequency. An output evaluation device is provided for evaluating the reference signal with a factor which is a function of the engine rotational speed, and a timer which acts as a monostable flip flop is disposed after the comparator.

7 Claims, 1 Drawing Figure

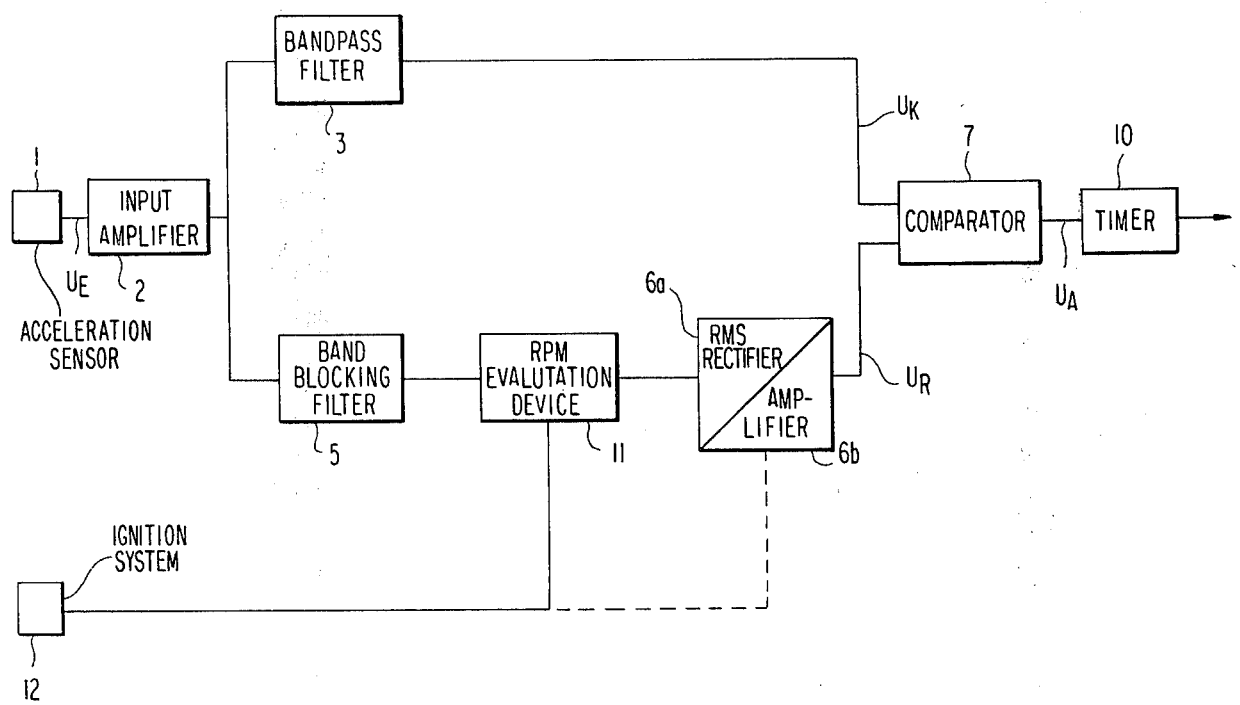

UNDESIRABLE COMBUSTION CHARACTERISTIC DETECTION APPARATUS

The present invention relates to a detection apparatus and, particularly, to an apparatus for detecting undesirable combustion characteristics in spark-ignited internal combustion engines, which apparatus includes an acceleration sensor and a band-pass filter tuned to a frequency of a knock vibration of the engine, with an output signal of the band-pass filter being compared with a reference signal or value, and with the result of a comparison being co-related with undesirable combustion characteristics to be recognized.

And, for example, commonly assigned co-pending U.S. application Ser. No. 151,990, now U.S. Pat. No. 4,329,871 the detecting apparatus of the aforementioned type is proposed wherein a rectifier is provided for body noise signals received by an acceleration sensor and passed through the band-pass filter, with a knocking signal being rectified in the rectifier. The series circuit is provided which is composed of a band-blocking filter tuned to the frequency of a knocking vibration, and r.m.s. rectifier, and an amplifier, through which a body noise signal received by the acceleration sensor is converted to a reference signal and whereby, in a comparator, the reference signal and whereby, in a comparator, the reference signal and the knocking signal are compared with one another and an output signal is generated when the knocking signal exceeds the reference signal.

In the aforementioned construction, the knocking signal, formed by an output signal of an acceleration sensor, is compared with a reference signal derived from the same output signal of the acceleration sensor and the results of the comparison are used to determined undesired combustion processes as well as for regulation of the engine operation.

It has now been found that low frequency noises as well as higher harmonics of the knocking frequency can influence the reference signals negatively in such a manner that the reference signal occasionally increases more sharply than necessary with increasing rotational speed of the engine thereby resulting in a deterioration of the sensitivity for recognizing knocking. It has also been found that very high but very short pulse trains not originating in knocking noises may produce the same signal as less high pulse groups which last for a longer time as is typical of knocking signals.

And, for example, U.S. Pat. No. 4,012,942, another detection apparatus of the aforementioned type is proposed wherein a second sensor produces a signal related or associated to the number of revolutions of the internal combustion engine. In the signal of the second sensor, a background noise reference signal is substracted from a square of the output signal of the band-pass filter and thus forms a "knock intensity" signal. The "knock intensity" signal is compared with another speed dependent "knock" limit signal or value. As a result of this comparison, a signal is provided which permits a recognition of intensity and frequency of so-called "pinging" of the engine.

A disadvantage of the last mentioned proposed arrangement resides in the fact that a relationship between background noise and speed of the engine is dependent upon the type as well as on the particular engine involved. Consequently, what is required by this proposed detection apparatus is an exact adjustment which must be repeated at regular intervals since it is in constant due to mechanical, thermal, and other influences.

The aim underlying the present invention essentially resides in providing a detection apparatus for detecting undesirable combustion characteristics which is constructed so that disturbances not originating in the engine knocking cannot have any effect upon the ultimate output or control signal.

In accordance with advantageous features of the present invention, a band-blocking filter is provided and is constructed so as to suppress, in addition to a knocking frequency, all frequencies below a lower frequency less than the knocking frequency and above an upper frequency higher than the knocking frequency are suppressed, with an rpm evaluation being provided for evaluating the reference signal of a factor which is a function of the engine rotational speed, and with the rectifier between the band-pass filter and comparator being replaced by a timer which acts as a monostable flip flop following or after the comparator.

In accordance with further advantageous features of the present invention, the evaluating device is formed by a monostable timer controlled by an ignition signal, with the timer short circuiting an input of the rms rectifier for a specific period of time after each ignition.

Advantageously, in accordance with further features of the present invention, the rpm evaluating device affects the amplification of the amplifier.

Accordingly, it is an object of the present invention to provide an apparatus for detecting undesirable combustion characteristics in spark-ignited internal combustion engines which have always, by simple means, shortcomings and disadvantages encountered in the prior art.

Another object of the present invention resides in providing an apparatus for detecting undesirable combustion characteristics in an internal combustion engine which is simple in construction and therefore inexpensive to manufacture.

Yet another object of the present invention resides in providing an apparatus for detecting undesirable combustion characteristics in internal combustion engines which enables a better filtering out of noise signals and a better distinguishing of knocking signals from remaining noise signals.

A still further object of the present invention resides in providing a detection apparatus for detecting undesirable combustion characteristics which enable an improved regulation of the internal combustion engine.

A still further object of the present invention resides in providing a detection apparatus for detecting undesirable combustion characteristics in spark-ignited internal combustion engines which enables a comparing of each individual pulse which passes through a band-pass filter with an improved reference signal followed by a "digital rectification".

Another object of the present invention resides in providing a detection apparatus for detecting undesirable combustion characteristics in internal combustion engines which functions reliably under all low ranges of operation of the engine.

These and other objects, features, and advantages of the present invention will become more apparent from the following description when taken in connection with the accompanying drawing which shows, for the purposes of illustration only, one embodiment in accordance with the present invention, and wherein:

The single FIGURE of the drawing is a schematic block diagram of an apparatus for detecting undesirable combustion characteristics and spark-ignited internal combustion engine in accordance with the present invention.

Before describing, in detail, the particular improved detecting apparatus in accordance with the present invention, it should be observed that the present invention resides primarily in the novel structural combination of conventional components and not in the particular detailed configurations thereof. Accordingly, the structure, control, and arrangement of these conventional components are illustrated in the single FIGURE of the drawing by readily understandable block representations in order to not obscure the disclosure with structural details which would be readily apparent to those skilled in the art having the benefit of the description herein. Thus, the block diagram illustration of the single FIGURE of the drawing does not necessarily represent the mechanical structural arrangement of the exemplary system, but is primarily intended to illustrate the major structural components of this system in a convenient functional grouping so that the present invention can more readily be understood.

Referring now to the single FIGURE of the drawing, an acceleration sensor 1 such as, for example, a piezoelectric crystal transducer for absorbing solid-borne sound is arranged at a suitable place such as, for example, a cylinder head (not shown) of an internal combustion engine (not shown). The acceleration sensor 1 provides an output signal $U_E$ to an input amplifier 2, the output of which is connected to a band-pass filter 3 and a band-stop or band-blocking filter 5 and subsequently to a comparator 7 in a manner described more fully in the aforementioned co-pending U.S. application Ser. No. 151,990. In such an arrangement, it may occur that low-frequency noises, as well as strong higher harmonics of a knocking frequency $f_K$ and noise signals created by a natural resonance of the acceleration sensor 1, may pass the band-blocking filter 5 and influence a reference signal $U_R$ forming an input signal to the comparator 7. Thus, the band-blocking filter 5, in accordance with the present invention, is constructed in such a manner that, in addition to the knocking frequency $f_K$, all frequencies below a lower frequency $f_u$, of approximately 1 kHz, and above an upper frequency $f_o$, of approximately 2 $f_K$ are suppressed.

In addition to providing a band-blocking filter 5 which is constructed so as to suppress, in addition to the knocking frequency $f_K$ all frequencies below a lower frequency $f_u$ less than the knocking frequency $f_K$ and above an upper frequency $f_o$ higher than the knocking frequency $u_K$, the present invention also provides an rpm evaluation device 11 which is adapted to evaluate the reference signal $U_R$ with a factor that depends upon the rotational speed of the engine. Additionally, in contradistinctions of the aforementioned co-pending U.S. application, the rectifier proposed therein between the band-pass filter 3 and comparator 7 is replaced by a timer 10 which functions as a monostable flip flop and is disposed after or downstream of the comparator 7.

It has been determined that a further negative influence may also be created by a steady rise in the reference signal $U_R$ with increasing rotational speed of the engine, thereby resulting in negative effects upon the sensitivity resulting from a lower amplitude differential between the knocking signal and the reference signal $U_R$. For this reason, the rpm evaluation device 11 is provided between the band-blocking filter 5 and the rms rectifier 6a. Advantageously, the rpm evaluation device 11 consists of a monostable timer controlled by an ignition system 12, with the timer short-circuiting an input of the rms rectifier 6a for a constant time interval $T_D$ of, for example, 2 ms, during each ignition. The reference $U_R$ formed by the rms rectifier 6a then decreases with increasing rotational speed of the engine. In other words, at a low rpm there is practically an insignificant correction; whereas, at a maximum rpm, the reference signal $U_R$ decreases by, for example, a factor of 2.

In the detecting apparatus proposed in the above-noted co-pending U.S. application, the knocking signal formed by the band-pass filter 3 is rectified before it reaches the comparator 7 with the result being that very high short pulse trains could produce the same signal at the input of the comparator 7 as less high long-lasting pulse trains which are characteristic of engine knocking.

In accordance with the present invention, the rectifier of the above-noted co-pending application, is replaced by the monostable flip flop 10 at the output side of the comparator 7, and, consequently, each pulse $U_K$ which exceeds the reference signal $U_R$ produces a pulse at the comparator output $U_A$ which is converted by the monostable flip flop into a pulse of a given duration of, for example, $T_x$ 3/2 × 1/$f_K$. Each new pulse resets the timer 10 formed as the monostable flip flop so that the rapid pulse trains at the input of the flip flop produce a single long pulse at the output thereof. In this manner, short pulse trains can better be distinguished from long pulse trains characteristics of real or actual knocking signals with the determinations to whether a knocking signal is present or not being made and the control signal derived therefrom obtained in the manner more fully described in connection with the aforementioned co-pending U.S. application Ser. No. 151,990.

An rpm evaluation of the reference signal $U_R$ may also be accomplished by using an rpm signal derived from the ignition system 12 as a control signal to change an amplification of the amplifier 6b which follows the rms rectifier 6a as indicated in phantom lines in the drawing.

It is also possible in accordance with the present invention for the timer 10 to be formed as a digital counting circuit which counts the number of successive output pulses from the comparator 7 and generates a signal corresponding to this number.

One of the advantages of the present invention resides in the fact that by comparing each individual pulse $U_K$ which passes the band-pass filter 3 with an improved reference signal $U_R$, followed by a digital rectification, the noise signals can be filtered out better and knocking signals are more readily distinguishable from the remaining noise signals, thereby enabling a far better regulation of the internal combustion engine.

While we have shown or described several embodiments in accordance with the present invention, it is understood that the same is not limited thereto but is susceptible of numerous changes and modifications as known to one having ordinary skill in the art and we therefor do not wish to be limited to the details shown and described herein, but intend to cover all such modifications as are encompassed by the scope of the appended claims.

We claim:

1. An apparatus for detecting undesirable combustion characteristics in the combustion process in a spark-ignited internal combustion engine and discriminating those characteristics from disturbances having similar characteristics which do not originate in the combustion process, the apparatus comprising sensor means for sensing solid borne signals and for providing a knocking frequency output signal in response thereto, band-pass filter means tuned to the frequency of an engine knocking vibration, wherein the output signal of the sensor means is fed to the band-pass filter means resulting in a knocking frequency signal, and band-blocking filter means for surpressing frequencies below a predetermined knocking vibration frequency lower than the knocking vibration frequency and frequencies above a predetermined knocking vibration frequency higher than the knocking vibration frequency, rotational speed evaluation means for evaluating an output signal from the band-blocking filter means, r.m.s. rectifier means arranged in series with the band-blocking filter means and evaluation means for forming a reference knock signal, comparator means for comparing the reference knock signal with the knocking frequency signal, and timer means responsive to the comparator means for supplying an output pulse of a predetermined duration when the comparator means senses the knocking frequency signal exceeds the reference knock signal.

2. An apparatus according to claim 1, wherein the timer means is a monostable flip flop.

3. An apparatus according to claim 2, wherein the evaluation means is a monostable timer means controllable by an ignition signal from an ignition system of the engine for short-circuiting an input to the r.m.s. rectifier means for a predetermined time period after each ignition.

4. An apparatus according to claims 1, 2, or 3, wherein an amplifier means is provided for amplifying the reference knock signal of the r.m.s. rectifier means and for providing an output signal to the comparator means.

5. An apparatus according to claim 4, wherein an input amplifier means is disposed between the sensor means and the band-pass filter means and band-blocking filter means for amplifying the output signal of the sensor means prior to an output signal being fed to the band-pass filter means and band-blocking filter means.

6. An apparatus according to claim 4, wherein the evaluation means is adapted to influence an amplification of the amplifier means.

7. An apparatus according to claim 3, wherein an amplifier means is provided for amplifying the reference knock signal of the r.m.s. rectifier means and for providing an output signal to the comparator means, and in that evaluation means includes an engine ignition means for providing a rotational speed control signal to the amplifier means to change an amplification thereof.

* * * * *